(12) United States Patent
Kang

(10) Patent No.: US 11,989,390 B2
(45) Date of Patent: May 21, 2024

(54) DISPLAY CONTROL METHOD AND TERMINAL DEVICE

(71) Applicant: VIVO MOBILE COMMUNICATION CO., LTD., Guangdong (CN)

(72) Inventor: Xu Kang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 185 days.

(21) Appl. No.: 17/672,455

(22) Filed: Feb. 15, 2022

(65) Prior Publication Data

US 2022/0171507 A1 Jun. 2, 2022

Related U.S. Application Data

(63) Continuation of application No. PCT/CN2020/099039, filed on Jun. 29, 2020.

(30) Foreign Application Priority Data

Aug. 21, 2019 (CN) .......................... 201910774620.3

(51) Int. Cl.
*G06F 17/00* (2019.01)
*G06F 3/0482* (2013.01)
(Continued)

(52) U.S. Cl.
CPC .......... *G06F 3/0482* (2013.01); *G06F 3/0488* (2013.01); *H04L 51/046* (2013.01)

(58) Field of Classification Search
CPC .... G06F 3/0482; G06F 3/0488; G06F 3/0481; G06F 9/451; H04L 51/046; H04L 51/10; H04L 51/52
See application file for complete search history.

(56) References Cited

U.S. PATENT DOCUMENTS

| 9,928,028 B2 * | 3/2018 | Jung ................... G06F 3/04845 |
| 10,712,936 B2 * | 7/2020 | Shi ...................... G06F 3/04886 |

(Continued)

FOREIGN PATENT DOCUMENTS

| CN | 102289339 A | 12/2011 |
| CN | 104063683 A | 9/2014 |

(Continued)

OTHER PUBLICATIONS

Extended European Search Report on the European Patent Application No. 20855765.2 issued by the European Patent Office dated Sep. 19, 2022.

(Continued)

*Primary Examiner* — Laurie A Ries
(74) *Attorney, Agent, or Firm* — IP & T GROUP LLP

(57) ABSTRACT

A display control method includes: receiving a first input performed by a user in a case that a first communication window is displayed on a screen of a terminal device; and displaying at least one first control on the screen in response to the first input. The at least one first control is associated with a display content of the first communication window, each of the at least one first control respectively corresponds to at least one object, and the display content of the first communication window includes at least one of a communication title, a communication content or a communication object.

16 Claims, 10 Drawing Sheets

(51) Int. Cl.
*G06F 3/0488* (2022.01)
*H04L 51/046* (2022.01)

(56) References Cited

U.S. PATENT DOCUMENTS

| | | | |
|---|---|---|---|
| 2008/0068344 A1* | 3/2008 | Kim | H04M 1/72412 |
| | | | 345/173 |
| 2013/0002683 A1 | 1/2013 | Li et al. | |
| 2013/0167077 A1* | 6/2013 | Nishihashi | G06F 3/04842 |
| | | | 715/800 |
| 2014/0223490 A1* | 8/2014 | Pan | H04N 21/8186 |
| | | | 345/173 |
| 2015/0200881 A1* | 7/2015 | Zheng | H04L 51/08 |
| | | | 345/473 |
| 2016/0231878 A1* | 8/2016 | Tsuda | H04L 51/04 |
| 2016/0357402 A1 | 12/2016 | Matas et al. | |
| 2017/0118145 A1 | 4/2017 | Aittoniemi et al. | |
| 2017/0286913 A1* | 10/2017 | Liu | H04W 4/12 |
| 2017/0336928 A1* | 11/2017 | Chaudhri | G06F 3/04886 |
| 2018/0018319 A1 | 1/2018 | He | |
| 2018/0077096 A1* | 3/2018 | DeMattei | H04L 51/58 |
| 2018/0268595 A1 | 9/2018 | Sarna et al. | |
| 2019/0199663 A1 | 6/2019 | Liu et al. | |

FOREIGN PATENT DOCUMENTS

| | | | | |
|---|---|---|---|---|
| CN | 104076944 A | | 10/2014 | |
| CN | 104394057 A | | 3/2015 | |
| CN | 104836726 A | | 8/2015 | |
| CN | 106327342 A | | 1/2017 | |
| CN | 106789543 A | | 5/2017 | |
| CN | 107038214 A | | 8/2017 | |
| CN | 107315488 A | | 11/2017 | |
| CN | 108255316 A | * | 7/2018 | G06F 3/0236 |
| CN | 108255316 A | | 7/2018 | |
| CN | 108363536 A | | 8/2018 | |
| CN | 108521366 A | | 9/2018 | |
| CN | 109361814 A | | 2/2019 | |
| CN | 109710753 A | | 5/2019 | |
| CN | 109828731 A | * | 5/2019 | |
| CN | 109977409 A | | 7/2019 | |
| CN | 110336733 A | | 10/2019 | |
| CN | 110609723 A | | 12/2019 | |
| WO | WO-2019184666 A1 | * | 10/2019 | G06F 3/0482 |
| WO | WO-2019206036 A1 | * | 10/2019 | G06F 3/0481 |
| WO | WO-2020024770 A1 | * | 2/2020 | G06F 3/0482 |

OTHER PUBLICATIONS

The First Office Action of Priority Application No. CN 201910774620.3 issued by the Chinese Patent Office dated Feb. 22, 2021.
The Second Office Action of Priority Application No. CN 201910774620.3 issued by the Chinese Patent Office dated May 10, 2021.
Notification to Grant Patent Right for Invention of Priority Application No. CN 201910774620.3 issued by the Chinese Patent Office dated Aug. 2, 2021.
International Search Report and Written Opinion of International Application No. PCT/CN2020/099039 issued by the Chinese Patent Office dated Sep. 28, 2020.

* cited by examiner

DISPLAY CONTROL METHOD AND TERMINAL DEVICE

CROSS-REFERENCE TO RELATED APPLICATIONS

This application is a Bypass Continuation Application of PCT/CN2020/099039 filed on Jun. 29, 2020, which claims priority to Chinese Patent Application No. 201910774620.3 filed on Aug. 21, 2019, which are incorporated herein by reference in their entirety.

TECHNICAL FIELD

Embodiments of the present disclosure relate to the field of communications technologies, and in particular, to a display control method and a terminal device.

BACKGROUND

When a user chats by a social application program of the terminal device, in order to satisfy the interest of chatting, the user usually need to chat with some interesting meme or pictures. Taking the meme as an example, when a user replies to different chat contents, different meme need to be sent, that is, the user requires different meme in different communication scenarios.

SUMMARY

Embodiments of the present disclosure provide a display control method and a terminal device.

According to a first aspect, embodiments of the present disclosure provide a display control method. The method includes: in a case that a first communication window is displayed on a screen of the terminal device, receiving a first input performed by a user; and displaying at least one first control on the screen in response to the first input, where the at least one first control is associated with a display content of the first communication window, each of the at least one first control respectively corresponds to at least one object, and the display content of the first communication window includes at least one of a communication title, a communication content or a communication object.

According to a second aspect, embodiments of the present disclosure further provides a terminal device. The terminal device includes: a receiving module and a display module, where the receiving module is configured to receive a first input performed by a user in a case that a first communication window is displayed on a screen of the terminal device; and the display module is configured to display at least one first control on the screen in response to the first input received by the receiving module. The at least one first control is associated with the display content of the first communication window, each of the at least one first control respectively corresponds to at least one object, and the display content of the first communication window includes at least one of a communication title, a communication content or a communication object.

According to a third aspect, embodiments of the present disclosure provide a terminal device, including a memory, a processor, and a computer program stored in the memory and executable on the processor, where when the computer program is executed by the processor, steps of the display control method according to the first aspect are implemented.

According to a fourth aspect, embodiments of the present disclosure provide a non-transitory computer readable storage medium, where the non-transitory computer readable storage medium stores a computer program, and when the computer program is executed by a processor, steps of the display control method according to the first aspect are implemented.

DETAILED DESCRIPTION OF EMBODIMENTS

Figures 1, 2:
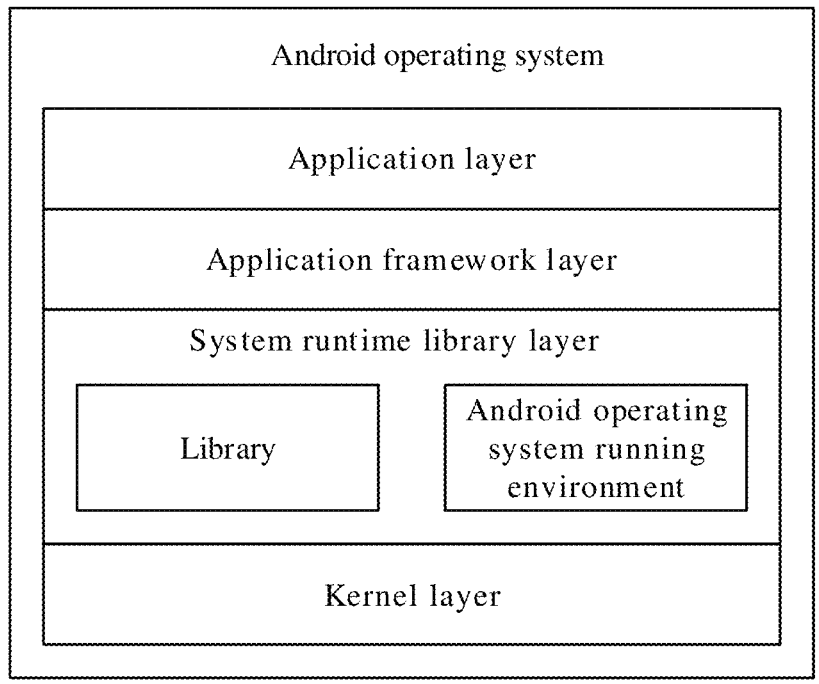
FIG. 1 is a schematic diagram of an architecture of a possible Android operating system according to an embodiment of the present disclosure.
FIG. 2 is a schematic flowchart of a display control method according to an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

It should be noted that "I" in this specification represents or. For example, A/B may represent A or B. "and/or" in this specification merely describes an association relationship between associated objects, and indicates that there may be three relationships. For example, A and/or B may represent that there are three cases: there is only A, there are both A and B, and there is only B. The term "a plurality of" refers to two or more.

It should be noted that in this embodiment of the present disclosure, the term such as "exemplary" or "for example" is used for representing an example, an illustration, or a description. Any embodiment or design scheme described as an "example" or "for example" in the embodiments of the present disclosure should not be explained as being more preferred or having more advantages than another embodiment or design scheme. To be precise, the use of the term such as "exemplary" or "for example" is intended to present a related concept in a specific manner.

In the specification and claims of the present disclosure, the terms "first", "second", and so on are intended to distinguish between different objects but do not describe a particular order of the objects. For example, a first input and a second input are intended to distinguish between different inputs, instead of describing a particular order of the inputs.

Generally, the user can trigger the terminal device to display one or more meme lists on the screen by operating the meme control in the communication window, such as a list of meme in favorite, a list of locally saved meme and a list of meme recommended by a network side device. In this way, the user can select the required meme from the lists of the meme and trigger the terminal device to send the meme in the communication window.

However, one or more meme lists generally include a large number of meme, and the meme are arranged disorderly; therefore, a user may need to look through these meme in these lists for many times before finding the required meme. That is, it is tedious and time-consuming to search for the meme required by the user.

According to the display control method provided by the embodiments of present disclosure, the first input performed by the user may be received in a case that the first communication window is displayed on the screen of the terminal device; and at least one first control associated with the display content of the first communication window is displayed on the screen in response to the first input, where each of the at least one first control respectively corresponds to at least one object, and the display content of the first communication window includes at least one of a communication title, a communication content or a communication object. That is, in a case that a user needs to search for objects such as the meme, the terminal device may display at least one first control with a small number and associated with the current display content, and will not directly display a large number of unordered meme and other objects, so that the user can trigger the terminal device rapidly and conveniently to acquire at least one object corresponding to the first target control, such as the meme required by the user. Therefore, the step that the user searches for the meme in a large number of unordered meme for many times is avoided, that is, the step of searching for the meme is simplified.

The terminal device in the embodiments of the present disclosure may be a mobile terminal device or a non-mobile terminal device. The mobile terminal device may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This is not specifically limited in the embodiment of the present disclosure.

It should be noted that, in the display control method provided by the embodiments of the present disclosure, an execution body may be a terminal device, a central processing unit (CPU) of the terminal device, or a control module configured to perform the display control method in the terminal device. In the embodiments of the present disclosure, the case where the terminal device performs the display control method is taken as an example to describe the display control method provided by the embodiments of the present disclosure.

The terminal device in the embodiments of the present disclosure may be a terminal device with an operating system. The operating system may be an Android operating system, or may be an iOS operating system or another possible operating system, which is not specifically limited in the embodiments of the present disclosure.

The Android operating system is taken as an example below to describe a software environment to which a display control method provided by the embodiments of the present disclosure is applied.

As shown in FIG. 1, FIG. 1 is a schematic diagram of an architecture of a possible Android operating system according to an embodiment of the present disclosure. In FIG. 1, the architecture of the Android operating system includes 4 layers, which are an application layer, an application framework layer, a system runtime library layer, and a kernel layer (which may be a Linux kernel layer).

The application layer includes various applications in the Android operating system (that include system applications and third-party applications).

The application framework layer is an application framework, and a developer may develop some applications based on the application framework layer following a rule of developing the application framework, for example, application programs such as a system setting application, a system chat application, and a system camera application; or application programs such as a third-party setting application, a third-party camera application, and a third-party chat application.

The system runtime library layer includes a library (also referred to as a system library) and an Android operating system runtime environment. The library mainly provides various resources required for the Android operating system. The running environment of the Android operating is used to provide the Android operating system with a software environment.

The kernel layer is an operating system layer of the Android operating system, and is a lowest layer of software levels of the Android operating system. The kernel layer provides core system services and hardware-related driver programs for the Android operating system based on the Linux kernel.

The Android operating system is taken as an example. In the embodiments of the present disclosure, based on the system architecture of the Android operating system as shown in FIG. 1, developers may develop software programs that implement the display control method provided by the embodiments of the present disclosure, so that the display control method can be performed based on the Android operating system as shown in FIG. 1. In other words, a processor or the terminal device may run the software program in the Android operating system to implement the display control method provided by the embodiments of the present disclosure.

The following describes in detail the display control method provided by the embodiments of the present disclosure with reference to the flowchart of the display control method shown in FIG. 2. A logical sequence of the display control method provided by the embodiments of the present disclosure is shown in the method flowchart, but in some cases, the shown or described steps may be performed in a sequence different from the sequence herein. For example, the display control method shown in FIG. 2 may include S201 and S202.

S201: the terminal device receives a first input performed by a user in a case that a first communication window is displayed on a screen of the terminal device.

A communication application program may be installed in the terminal device, and the communication application program may provide a communication window to support two or more communication objects (one communication object corresponds to one user) to chat. Exemplarily, the first communication window may be a communication window of two or more communication objects. Certainly, two or more communication objects in the first communication window includes a communication object corresponding to a user.

In addition, the terminal device may receive and transmit communication content in the communication window, and the type of the communication content may include text, picture (such as meme), link, audio and video. Optionally, in the embodiments of the present disclosure, the object transmitted and displayed by the terminal device in the communication window (such as the first communication window) is the communication content in the communication window.

It should be noted that in the embodiments of the present disclosure, the interactive information in the communication window is described as communication content, object or display content in different positions, and different names are only used to distinguish clearly in different scenarios and will not affect the essence of the interactive information.

It may be understood that in the scenario where a user replies the communication content (such as the last communication content) in the current first communication window, the user may perform the first input for the first communication window.

It should be noted that the terminal provided by the embodiments of the present disclosure may be provided with a touch screen; and the touch screen may be configured to receive the input performed by the user and display the content corresponding to the input to the user in response to the input. The above first input may be a touch screen input, a fingerprint input, a gravity input, a key input and the like. The touch screen input is a pressing input, a long pressing input, a sliding input, a click input, a suspension input (the input performed by a user near the touch screen) and the like of a user on the touch screen of the terminal. The fingerprint input is a swipe fingerprint input, a long-press fingerprint input, a single-click fingerprint input, and a double-click fingerprint input of a user on the terminal's fingerprint reader. The gravity input is an input of shaking a terminal in a specific direction by a user, shaking for a specific quantity of times, or the like. The key input corresponds to the single-click operation, double-click operation, long-press operation, combined key operation and the like performed by a user on a power key, a volume key, a home key and the like of the terminal. Optionally, the embodiments of the present disclosure do not specifically limit the form of the first input, which may be any achievable form.

Exemplarily, the first input may be a specific input performed by a user on the first communication window, for example, a sliding track in the first communication window is an arc sliding input; or the first input may be a long-press input performed by a user on a certain communication content in the first communication window.

S202: the terminal device displays at least one first control on the screen in response to the first input;

where the at least one first control is associated with a display content of the first communication window, and each of the at least one first control respectively corresponds to at least one object.

It should be noted in the embodiments of the present disclosure, the object may be meme, picture or other files.

Each of the at least one first control is provided with one piece of object information, and at least one object corresponding to one first control is an object indicated by the object information of the first control. That is, the object information of one first control may serve as an index of the at least one object corresponding to the first control.

It may be understood that a user may need to reply different meme in different communication scenarios. For example, when the terminal device receives an electronic red packet in the first communication window, that is, when the communication scenario of the first communication window is the red packet scenario, a user may need to replay the meme "thank you, boss".

According to the display control method provided by the embodiments of present disclosure, the first input performed by the user may be received in a case that the first communication window is displayed on the screen of the terminal device; and at least one first control associated with the display content of the first communication window is displayed on the screen in response to the first input, where each of the at least one first control respectively corresponds to at least one object, and the display content of the first communication window includes at least one of a communication title, a communication content or a communication object. That is, in a case that a user needs to search for objects such as the meme, the terminal device may display at least one first control with a small number and associated with the current display content, and will not directly display a large number of unordered meme and other objects, so that the user can trigger the terminal device rapidly and conveniently to acquire at least one object corresponding to the first target control, such as the meme required by the user. Therefore, the step that the user searches for the meme in a large number of unordered meme for many times is avoided, that is, the step of searching for the meme is simplified.

In a possible implementation manner, the display control method provided by the embodiments of the present disclosure may further include S203 before the S202, for example, may further include S203 before S201.

S203: the terminal device determines the target scenario information according to the display content of the first communication window;

where the at least one first control corresponds to target scenario information.

It should be noted that the terminal device may take the control corresponding to the target scenario information as at least one first control when determining that the target scenario information is acquired, that is, at least one first control associated with the display content of the first communication window is obtained.

It may be understood that objects (such as meme) which a user needs to reply are generally different in a case that the communication scenarios of the first communication window are different. Optionally, the object which the user generally needs to reply may be an object corresponding to the communication scenario of the first communication window.

For example, when the terminal device receives an electronic red packet in the first communication window, that is, when the communication scenario of the first communication window is the red packet scenario, a user may need to replay the meme "thank you, boss".

Optionally, the above target scenario information is determined by the terminal device in real time, or is determined by a server interacting with the terminal device in real time.

Exemplarily, in a first application scenario provided by the embodiments of the present disclosure, the display content of the first communication window includes a communication title (recorded as information 1). That is, the terminal device determines the target scenario information according to the information 1. For example, a title indicated by title information of the first communication window may be "XX company", "XX department", "XX unit", "XX software" or "XX development". Optionally, the terminal device may determine different target scenario information according to different communication titles of the communication window.

a. For example, the communication title of the first communication window is "XX company", "XX department" or "XX unit", then the terminal device determines the communication scenario indicated by the target information as "working scenario", a pop-up box of this scenario may include "notice", "welcome freshman", "asking for help", "suggestion" and other controls, and these controls are the at least one first control.
  b. For example, the communication title of the first communication window is "XX software", "XX development" and the like, then the terminal device determines the communication scenario indicated by the target information as "technical scenario", a pop-up box may include "master, take me", "666", "like" and other controls, and these controls are the at least one first control.

In a second application scenario provided by the embodiments of the present disclosure, the display content of the first communication window includes a communication content (recorded as information 2). That is, the terminal device determines the target scenario information according to the information 2. The communication content of the first communication window may be a keyword included in the communication content, or the communication content itself, or the content type of the communication content (such as text, picture, audio, video or link).

a. For example, the communication content selected by the user through the first input is the electronic red packet, then the terminal device determines the communication scenario indicated by the target scenario information as "red packet scenario". Furthermore, the pop-up box may include "thank you, boss", "the red packet is too small", "one cent is love" and other controls, and these controls are the at least one first control. The communication content selected by the user through the first input may be information which the user needs to reply.
  b. For example, the communication content selected by the user through the first input is vote link, then the terminal device determines the communication scenario indicated by the target scenario information as "vote scenario". Furthermore, the pop-up box may include "please vote", "rapid click", "voted" and other controls, and these controls are the at least one first control.

Exemplarily, the terminal device may determine whether the communication content includes characters "vote" to determine whether the communication content is the vote link.

c. For example, the communication content selected by the user through the first input is news link, then the terminal device determines the communication scenario indicated by the target scenario information as "news scenario". Furthermore, the pop-up box may include "you are out", "true or false", "circusee", "onlookers" and other controls, and these controls are the at least one first control.
  d. For example, the communication content selected by the user through the first input is memes or pictures, then the terminal device determines the communication scenario indicated by the target scenario information as "sticker fighting scenario". Furthermore, the pop-up box may include "diss", "you don't scare me", "bring it on" and other controls, and these controls are the at least one first control.

In a third application scenario provided by the embodiments of the present disclosure, the display content of the first communication window includes a communication object (recorded as information 3). That is, the terminal device determines the target scenario information according to the information 3. Optionally, the target information is information of the communication object (recorded as a target chat object) for sending the communication content (recorded as the target communication content) in the first communication window.

Optionally, the target communication content may be the last communication content in the first communication window by default, or one or more communication contents operated by the user through the first input.

The information of the target chat object may indicate at least one of the name of the target chat object, the group of the target chat object in the contacts or the label of the target chat object. Optionally, the terminal device may determine a relationship between a user (recorded as a target user) corresponding to the target chat object and a user according to the information of the target chat object. For example, the terminal device determines a relationship with the person according to the name or unit or group of the target general object, and finally determines that the communication scenarios indicated by the target scenario information are "family scenario", "friend scenario", "colleague scenario", "schoolmate scenario" and the like.

a. For example, the user corresponding to the communication object (that is, the target communication object) of the communication content selected by the user through the first input is the father of the user, then the terminal device determines that the communication scenario indicated by the target scenario information is "family scenario". Furthermore, the pop-up box may include "take care of yourself", "I miss you" and other controls, and these controls are the at least one first control.
  b. For example, the user corresponding to the communication object (that is, the target communication object) of the communication content selected by the user through the first input is the friend of the user, then the terminal device determines that the communication scenario indicated by the target scenario information is "friend scenario". Furthermore, the pop-up box may include "go for a drink", "hang out", "gang up" and other controls, and these controls are the at least one first control.

Optionally, optionally, in a fourth application scenario, the target scenario information is pre-defined. That is, the terminal device determines the pre-defined target scenario information as the target scenario information.

Exemplarily, the pop-up box corresponding to the predefined target scenario information may include "are you there", "did you eat", "hello" and other controls, and these controls are the at least one first control.

It may be understood that an association relationship between the scenario information and the corresponding at least one first control is preset by a system; the scenario information is the common scenario in life, for example, "working scenario" and "red packet scenario" in the above example; and the object information of the first control corresponding to the scenario information may be a common phrase in the corresponding scenario.

It should be noted that in the embodiments of the present disclosure, in a case that the target scenario information is determined according to the display content in the current chat window, the description of the display content including more of information 1 to information 3 may be referenced to the related description of the first scenario information to the third application scenario in the above embodiment, which will not elaborated by the embodiments of the present disclosure herein.

It should be noted that in the display control method provided by the embodiments of the present disclosure, the terminal device may automatically determine the target scenario information corresponding to the current first communication window and obtain at least one first control corresponding to the target scenario information, so that at least one object (that is, at least one meme) corresponding to each first control can be obtained. In this way, the terminal device may display at least one first control associated with the display content of the first communication window on the screen, and it is beneficial to increase the degree that the object such as meme provided by the terminal device meets the requirements of the user.

In the display control method provided by the embodiments of the present disclosure, in a case that the user needs to view at least one object corresponding to each first control, the terminal device may be triggered to display the corresponding object on the screen, so that selection input is performed on these objects. Optionally, after the S202, the method may further include S204 and S205.

S204: the terminal device receives a second input performed by a user for a first target control, where the first target control is a control of the at least one first control.

Similarly, the description of the input form of the second input may be referenced to the related description of the input form of the first input, which will not be elaborated herein. Exemplarily, the second input is a click input performed by the user to the first target control.

Object information of the first target control may serve as an index of at least one object corresponding to the first target control.

It may be understood that the at least one object corresponding to the first target control may be an object including the object information of the first target control, or an object whose title (or label) is the object information of the first target control.

S205: the terminal device displays at least one object corresponding to the first target control on the screen in response to the second input.

Exemplarily, when the terminal device receives an electronic red packet in the first communication window, that is, when the communication scenario of the first communication window is a red packet scenario, the object information of the first target control may be "thank you, boss", and the at least one object corresponding to the first control is a meme corresponding to "thank you, boss".

The display control method provided by the embodiments of the present disclosure will be illustrated below through the examples in FIG. 3A to FIG. 4D.

Figure 3A:
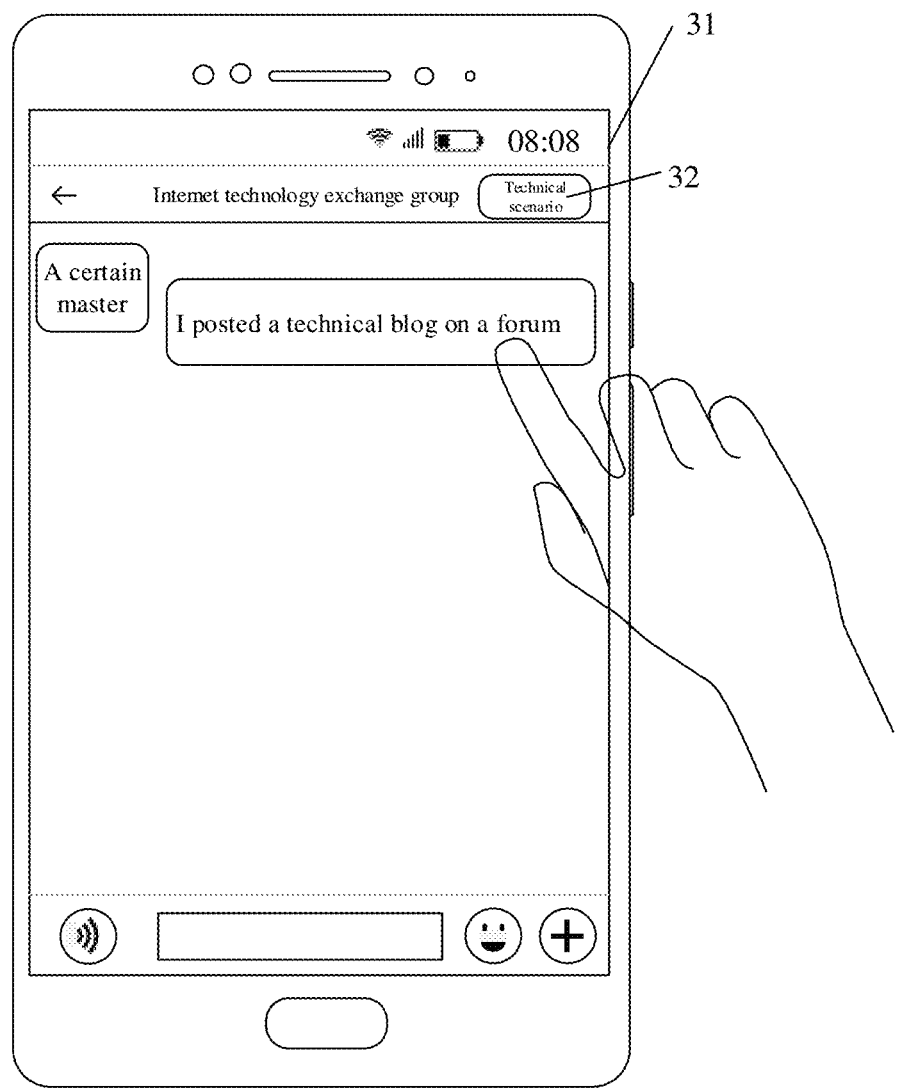
FIG. 3A is a first schematic diagram of the display content of a terminal device according to an embodiment of the present disclosure.
Figure 3B:
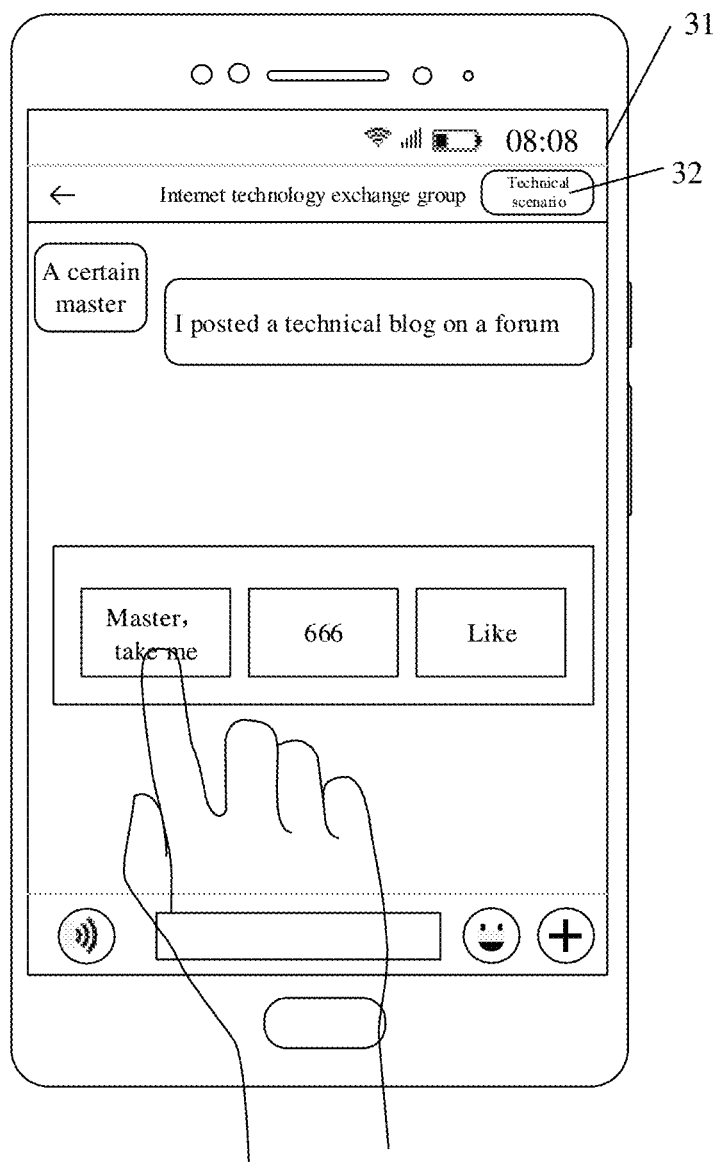
FIG. 3B is a second schematic diagram of the display content of a terminal device according to an embodiment of the present disclosure.

As shown in FIG. 3A, the first communication window 31 displayed on the screen of the terminal device includes a title "Internet technology exchange group", an identifier "a certain master" of a communication object and a communication content "I posted a technical blog on a forum". After the user's long-press input (that is, the first input) of the communication content "I posted a technical blog on a forum", as shown in FIG. 3B, the "master, take me" control, the "666" control and the "like" control are displayed on the screen of the terminal device, where the object information of the "master, take me" control is master, take me, the object information of the "666" control is 666, and the object information of the "like" control is like.

Optionally, the communication scenario indicated by the target scenario information of the first communication window 31 may be a technical scenario, and the at least one control corresponding to the target scenario information is the "master, take me" control, the "666" control and the "like" control.

Figure 3C:
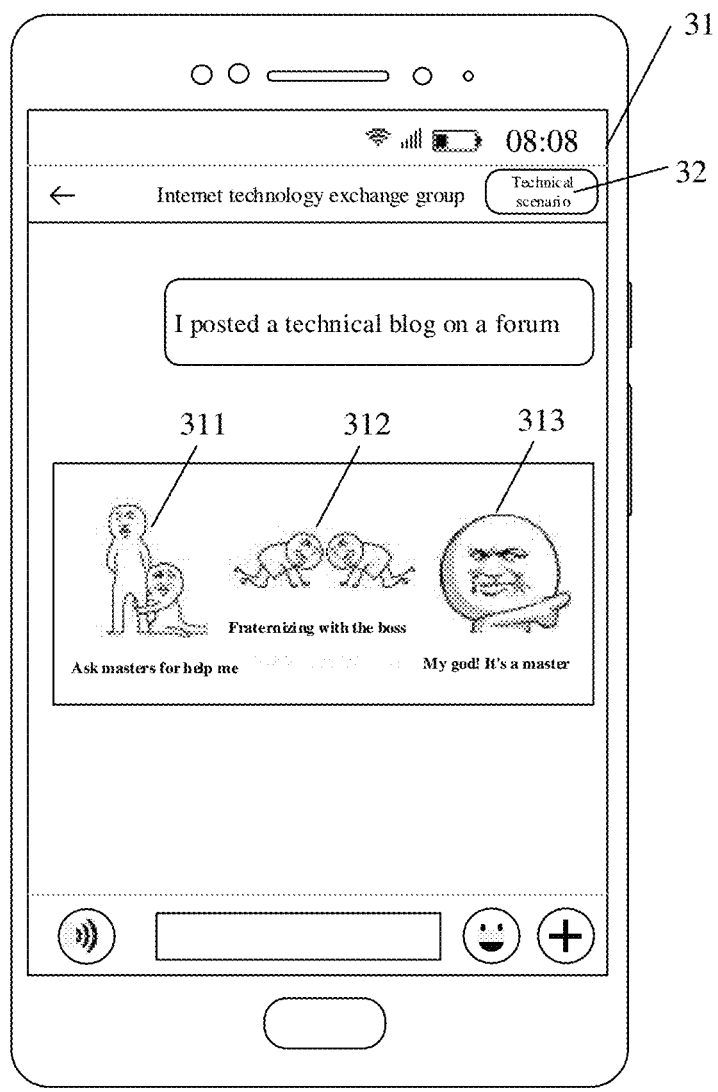
FIG. 3C is a third schematic diagram of the display content of a terminal device according to an embodiment of the present disclosure.

Optionally, in a case that the "master, take me" control is the first target control, after the click input (that is, the second input) performed by the user for the "master, take me" control, as shown in FIG. 3C, a meme 311, a meme 312 and a meme 313 corresponding to the "master, take me" control may be displayed on the screen of the terminal device. That is, the meme 311, the meme 312 and the meme 313 are the at least one object corresponding to the first target control.

Figure 3D:
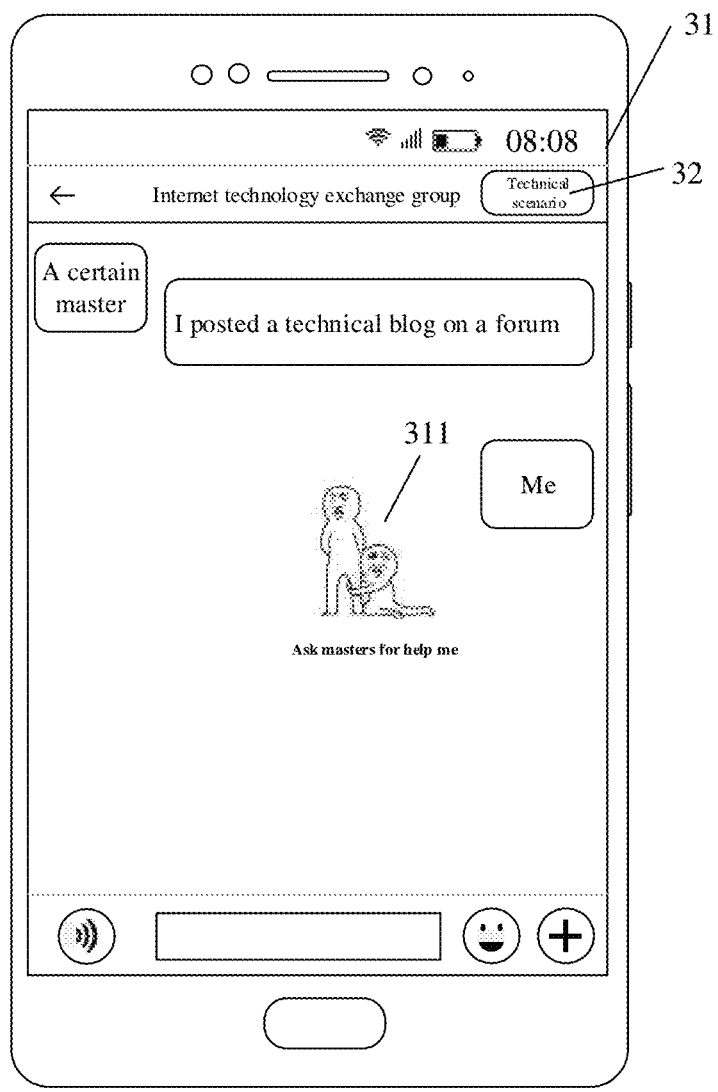
FIG. 3D is a fourth schematic diagram of the display content of a terminal device according to an embodiment of the present disclosure.

Optionally, after the click input performed by the user for the meme 311 shown in FIG. 3C, as shown in FIG. 3D, the terminal device may successfully send and display the meme 311 in the first communication window 31. Obviously, the meme 311 is a meme meeting the technical scenario.

Figure 4A:
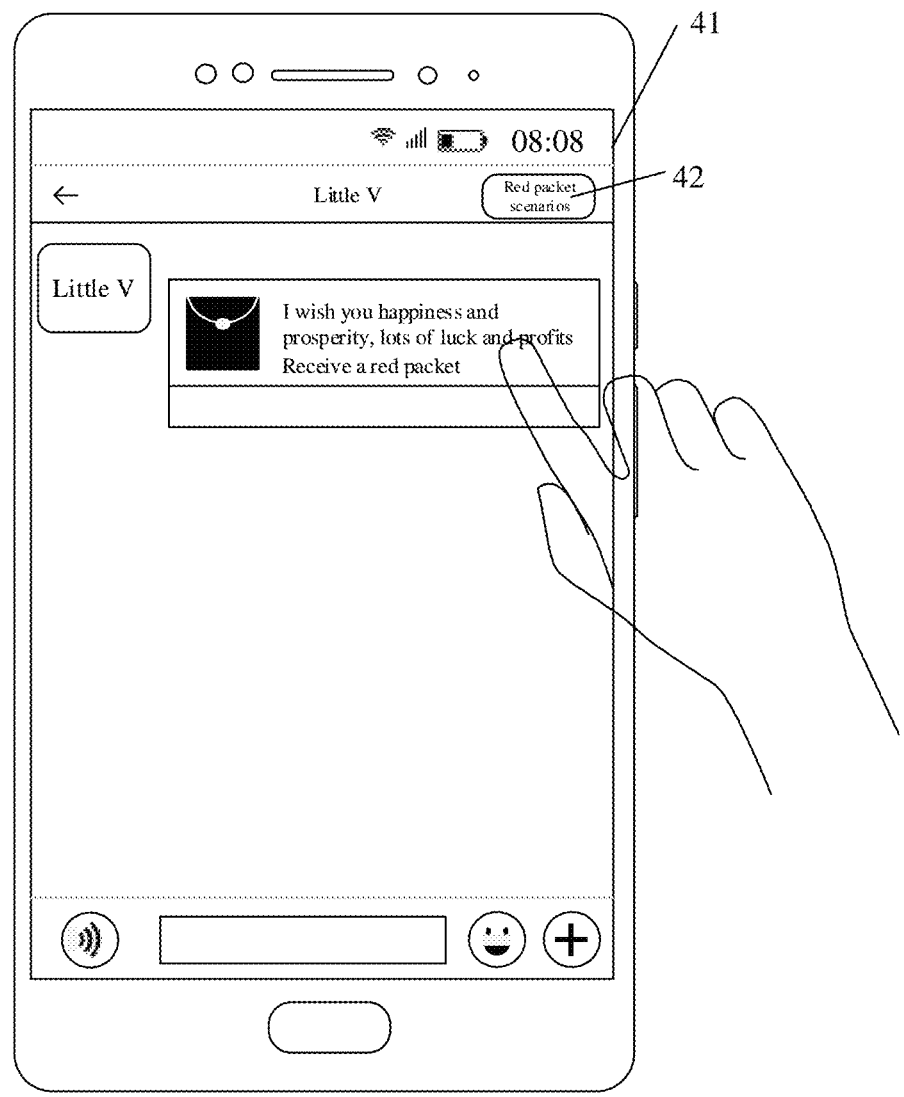
FIG. 4A is a fifth schematic diagram of the display content of a terminal device according to an embodiment of the present disclosure.
Figure 4B:
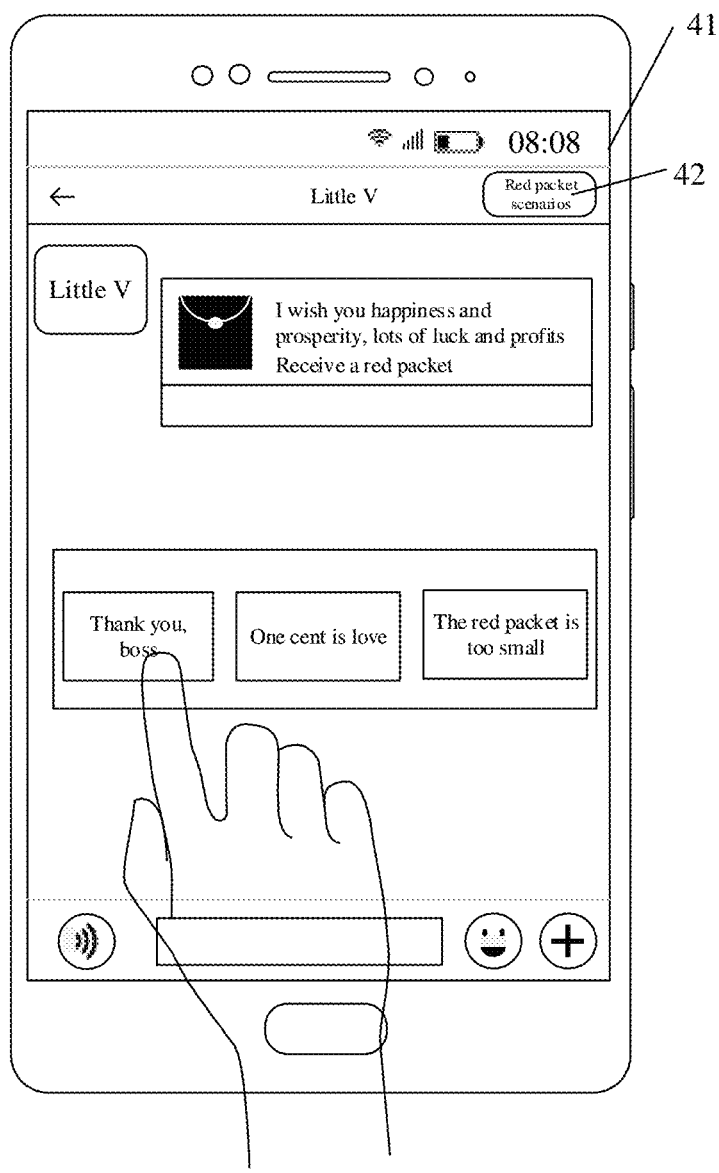
FIG. 4B is a sixth schematic diagram of the display content of a terminal device according to an embodiment of the present disclosure.

As shown in FIG. 4A, the first communication window 41 displayed on the screen of the terminal device includes a title "red packet scenario", an identifier "little v" of a communication object and a communication content of electronic red packet "I wish you happiness and prosperity, lots of luck and profits". After the user's long-press input (that is, the first input) of electronic red packet "I wish you happiness and prosperity, lots of luck and profits", as shown in FIG. 4B, the "thank you, boss" control, the "one cent is love" control and the "the red packet is too small" control are displayed on the screen of the terminal device, where the object information of the "thank you, boss" control is thank you, boss, the object information of the "one cent is love" control is one cent is love, and the object information of the "the red packet is too small" control is the red packet is too small.

Optionally, the target scenario information (recorded as scenario information 2) of the first communication window 41 indicates a red packet scenario, and at least one control may be the "thank you, boss" control, the "one cent is love" control and the "the red packet is too small" control.

Figure 4C:
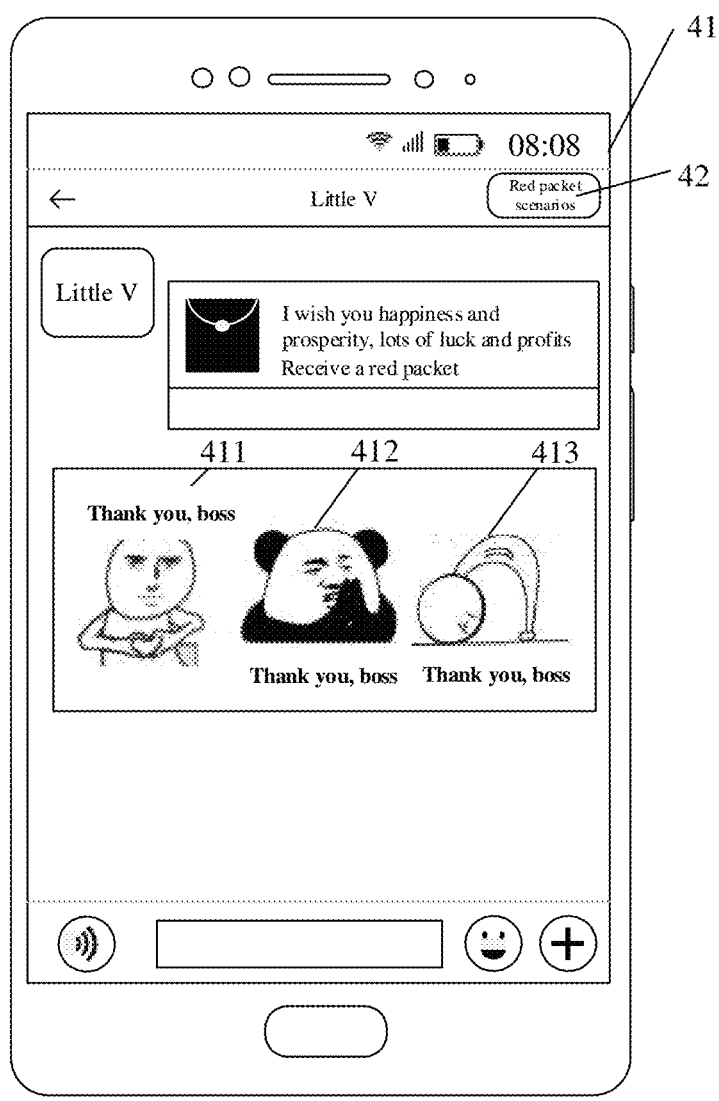
FIG. 4C is a seventh schematic diagram of the display content of a terminal device according to an embodiment of the present disclosure.

Optionally, in a case that the "thank you, boss" control is the first target control, after the click input (that is, the second input) performed by the user for the "thank you, boss" control, as shown in FIG. 4C, a meme 411, a meme 412 and a meme 413 corresponding to the "thank you, boss" control may be displayed on the screen of the terminal device. That is, the meme 411, the meme 412 and the meme 413 are the at least one object corresponding to the first target control.

Figure 4D:
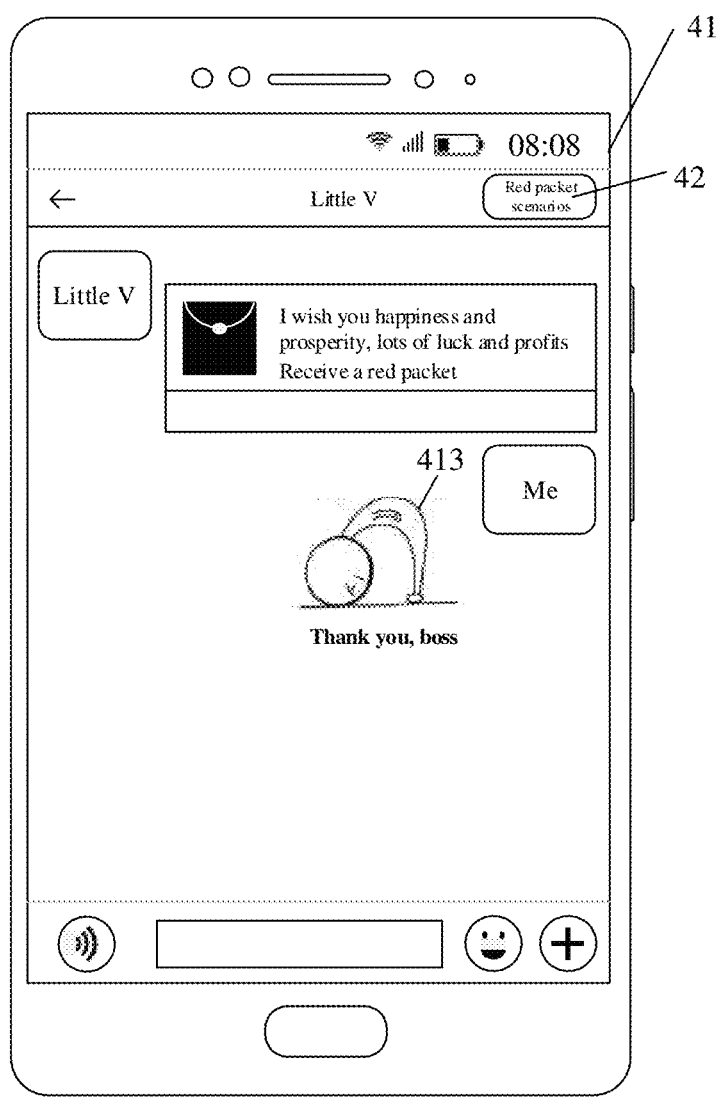
FIG. 4D is an eighth schematic diagram of the display content of a terminal device according to an embodiment of the present disclosure.

Optionally, after the click input performed by the user for the meme 413 shown in FIG. 4C, as shown in FIG. 4D, the terminal device may successfully send and display the meme 413 in the first communication window 41. Obviously, the meme 413 is a meme corresponding to the target scenario information indicating the red packet scenario.

It should be noted that in the display control method provided by the embodiments of the present disclosure, the second input performed by the user for the first target control in the at least one first control may trigger the terminal device to display at least one object corresponding to the first target control, for example, to display an object such as the meme meeting the requirements of the user. Therefore, the terminal device can rapidly display the object such as the meme required by the user, and the step of searching for the object such as the meme is simplified.

In a possible implementation manner, in the display control method provided by the embodiments of the present disclosure, the S203 may be implemented through S203a-S203c.

S203a: according to the display content of the first communication window, the terminal device searches for the first scenario information corresponding to the display content of the first communication window in a preset scenario information base; where the preset scenario information base includes at least one piece of scenario information (for example, including first scenario information), information of display content of the communication window corresponding to each of the at least one piece of scenario information, and information of at least one control corresponding to each of the at least one piece of scenario information (that is, the object information of each of the at least one first control).

It may be understood that the terminal acquiring the display content of the current communication window (such as the first communication window) may be: the display content serves as an index, the scenario information (such as the first scenario information) corresponding to the display content is found from the preset scenario information base, and the at least one first control corresponding to the scenario information is obtained.

Optionally, the preset scenario information base may be stored in the terminal device, or in a server interacting with the terminal device.

Optionally, the terminal device may provide a user with an entry to modify information in the preset scenario information base so as to support the user to trigger to delete, add or modify certain scenario information in the preset scenario information base and delete, add or modify some first controls corresponding to certain scenario information.

Optionally, the setting application program of the terminal device may provide an entry to modify the information in the preset scenario information base.

S203b: the terminal device determines the first scenario information as the target scenario information in a case that the first scenario information is found.

It may be understood that the first scenario information may be determined and stored by the terminal device or the server in advance according to the display content of the first communication window.

S203c: the terminal device determines pre-defined scenario information as the target scenario information in a case that the first scenario information is not found.

Optionally, in the embodiments of the present disclosure, the terminal device determines different priorities of the target scenario information according to different modes.

For example, the priorities for determining the modes of the target scenario information are sequentially reduced: mode 1, mode 2, mode 3 and mode 4.

The mode 1 is used to indicate the terminal device to determine the target scenario information according to the information 1; the mode 2 is used to indicate the terminal device to determine the target scenario information according to the information 2; the mode 3 is used to indicate the terminal device to determine the target scenario information according to the information 3; and the mode 4 is used to indicate to determine the pre-defined scenario information as the target scenario information.

Optionally, the terminal device determines the target scenario information according to the high priority mode, and then determines the target scenario information according to the secondary high priority in a case that determination fails.

It may be understood that the terminal device fails to determine the target scenario information by the mode 1 to the mode 3, which indicates that the scenario information corresponding to the corresponding target information is not stored in the pre-defined scenario information base. That is, in a case of failing to determine the target scenario information according to the display content of the first communication window, the terminal device determines the pre-defined scenario information as the target scenario information.

It should be noted that in the display control method provided by the embodiments of the present disclosure, the terminal device may determine the target scenario information through many modes, so even if the determination of the target scenario information through a higher priority mode fails, the target scenario information may also be determined through a lower priority mode. In this way, it may be ensured that the terminal device determines to acquire the target scenario information of the current first communication window, so that at least one first control corresponding to the target scenario information is obtained.

In a possible implementation manner, the display control method provided by the embodiments of the present disclosure may further include S206.

S206: the terminal device displays a second control on the screen,
where the second control is used to indicate target scenario information.

Optionally, the terminal device may display a second control at a preset position of the screen, such as the upper left corner or the upper right corner.

Exemplarily, as shown in FIG. 3A to FIG. 3D, the terminal device displays a control 32 at the upper right corner of the screen, and the current target scenario information "technical scenario" is displayed on the control 32. As shown in FIG. 4A to FIG. 4D, the terminal device displays a control 42 on the upper right corner, and the current target scenario information "red packet scenario" is displayed on the control 42.

In the embodiments of the present disclosure, S206 may be performed after S201, and the sequence of S202 and S206 is not specifically limited. For example: the terminal device may perform S202 and S206 at the same time, that is, the terminal device may display a second control and at least one first control on the screen at the same time.

Optionally, in the display control method provided by the embodiments of the present disclosure, the second control may be display first, and then at least one first control may be displayed under the triggering of the user, that is, S206 is performed first and then S202 is performed. Optionally, the first input includes a first sub-input and a second sub-input, S206 may be replaced with S206a, and S202 may be replaced with S202a.

S206a: the terminal device displays the second control on the screen in response to the first sub-input.

S202a: the terminal device displays at least one first control on the screen in response to the second sub-input;

where the first sub-input is an input for the first communication window, the second sub-input is an input for the second control, and the second control is used to indicate the target scenario information.

Similarly, the description of the input form of the first sub-input and the second sub-input may be referenced to the related description of the input form of the first input, which will not be elaborated herein.

Exemplarily, the first sub-input is a long-press input performed by the user on the last communication content in the first communication window, and the second sub-input is a long-press input performed by the user to the second control.

Therefore, the user may choose whether to trigger the terminal device to display the second control and/or the at least one first control according to the own requirements, which is beneficial to improving the human-computer interaction performance of the user in the process of searching for the object such as the meme by using the terminal.

Optionally, after the S206, the display control method provided by the embodiments of the present disclosure may further include S207 and S208.

S207: the terminal device receives a third input of the user for the second control.

Similarly, the description of the input form of the third input may be referenced to the related description of the input form of the first input, which will not be elaborated herein.

Exemplarily, the third input includes an input performed by the user for the control 32 shown in FIG. 3A to FIG. 3D and an input of modifying the at least one input corresponding to the target scenario information indicated by the control 32 (that is, modifying the object corresponding to at least one control).

S208: the terminal device modifies first information in response to the third input, where the first information includes at least one of following: the target scenario information or an object corresponding to a second target control, and the second target control is a control of the at least one first control.

The second control is an entry to modify the target scenario information and the object corresponding to the second target control.

It may be understood that the user may modify the target scenario information and the object corresponding to the second target control through the second control; and in a case that the user is not satisfied with the recommended first control, the user may click the second control for edition to trigger the satisfied first control to be added to the scenario, or may also trigger to delete the unnecessary first control to facilitate subsequent reuse.

Optionally, optionally, the user may perform double-click input on the current second control to edit the information of the second control, and manually specify the communication scenario indicated by the target scenario information and the first control included in the corresponding pop-up box. The manually edited target scenario information and the corresponding at least one first control may be stored in a system (such as the system of the terminal device), so that the terminal can directly use the scenario information conveniently next time.

It should be noted that in the display control method provided by the embodiments of the present disclosure, the second control may be displayed on the screen of the terminal device, and the second control is used to indicate the target scenario information and is configured to trigger to modify the target scenario information and the object corresponding to the control of the at least one first control. Therefore, the user may modify the current target scenario information and the at least one first control into the information meeting the requirements of the user, so that the target scenario information determined by the terminal device subsequently is the scenario information meeting the requirements of the user, and the object (that is, meme) meeting the requirements of the user can be obtained.

In a possible implementation manner, the display control method provided by the embodiments of the present disclosure may further include step S209.

S209: the terminal device displays the at least one first control on the screen in a case that the first communication window is switched into a second communication window and a fourth input for the second communication window is received, where first target scenario information corresponding to the first communication window is different from second target scenario information corresponding to the second communication window.

Similarly, the description of the input form of the fourth input may be referenced to the related description of the input form of the first input, which will not be elaborated herein.

Optionally, the first target scenario information is the scenario information determined by the terminal device according to the display content of the first communication window, that is, the first target scenario information is applied to the actual communication scenario of the display content in the first communication window. Similarly, the description of the second target scenario information may be referenced to the description of the first target scenario information, which will not be elaborated in the embodiments of the present disclosure.

Optionally, the user may perform preset input (such as long-press input) on the second control displayed on the first communication window and fix the communication scenario (that is, fix the current target scenario information) of the current window, or may also unlock fixation. The user may also set a global fixed communication scenario (that is, set scenario information) in the system, and use a certain communication scenario for all communication windows.

Exemplarily, the actual communication scenario of the first communication window is "technical scenario", that is, the communication scenario indicated by the target scenario information is "technical scenario", the actual communication scenario of the second communication window is "news scenario", and at this time, the terminal device determines that the scenario information of the second communication window is still the target scenario information. Therefore, in a case that the terminal device displays the second communication window, the terminal device displays "master, take me", "666", "like" and other controls based on the first input, and does not display "you are out", "true or false", "circusee", "onlookers" and other controls.

Optionally, after the S209, the display control method provided by the embodiments of the present disclosure may further include S210.

S210: the terminal keeps displaying the second control in a case that the first communication window is switched into the second communication window, where the first target scenario information corresponding to the first communication window is different from the second scenario information corresponding to the second communication window.

That the terminal device keeps displaying the second control on the screen means that the terminal device fixes the scenario information of the communication window as the target scenario information, and does not change the communication scenario indicated by the target scenario information with the change of the display content of the communication window.

It should be noted that in the display control method provided by the embodiments of the present disclosure, when the user requires the terminal device to display at least one first control displayed in the communication window unchanged, the user may trigger the terminal device to fix the scenario information of the communication window so as to display the same at least one first control in different communication windows. Therefore, it is beneficial to improve the human-computer interaction performance in the process of finding meme.

Optionally, after the user performs input (such as click input) on a certain object of at least one object displayed by the terminal device on the screen, the user may trigger the terminal device to send the object (such as meme) in the first communication window.

Optionally, in the conversion and chat process of the user, the user uses the finger to long press text, voice, picture, expression or forwarded message sent by a certain user (that is, an communication object) to be interacted, or uses a sliding gesture to pop up one group of scenario-based choice box (that is, including the choice box of at least one first control) by recognizing the conversion scenario, the user may search for the option name according to the expression library (that is, may use a picture library or a third-party expression library) after choosing a certain option (that is, one first control) and recommend one group of expressions, and the user may choose and send the expressions.

Optionally, the display control method provided by the embodiments of the present disclosure may trigger the object sending step through S211 and S212.

S211: the terminal device receives a fifth input performed by the user for the target object;

where the target object is an object of at least one object corresponding to the first target control.

Similarly, the description of the input form of the fifth input may be referenced to the related description of the input form of the first input, which will not be elaborated herein. Exemplarily, the fifth input is a double-click input performed by the user for the target object.

S212: the terminal device transmits the target object in the first communication window in response to the fifth input.

In this way, the target object displayed by the terminal device may be an object meeting the requirements of the user, so it is beneficial to reduce the operation that the user triggers the terminal device to search for the object such as meme and improve the convenience of transmitting the object.

Figure 5:
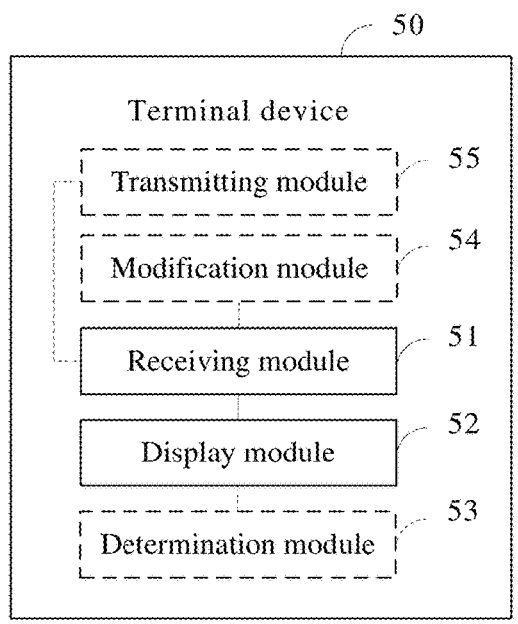
FIG. 5 is a possible schematic structural diagram of a terminal device according to an embodiment of the present disclosure.

As shown in FIG. 5, FIG. 5 is a possible structural schematic diagram of a terminal device according to an embodiment of the present disclosure. The terminal device 50 shown in FIG. 5 includes: a receiving module 51 and a display module 52, where the receiving module 51 is configured to receive a first input performed by a user in a case that a first communication window is displayed on a screen of the terminal device; and the display module 52 is configured to display at least one first control on the screen in response to the first input received by the receiving module 51. The at least one first control is associated with the display content of the first communication window, each of the at least one first control respectively corresponds to at least one object, and the display content of the first communication window includes at least one of a communication title, a communication content or a communication object.

Optionally, the at least one first control corresponds to the target scenario information. The terminal device 50 further includes: a determination module 53, where the determination module 53 is configured to determine target scenario information according the display content of the first communication window before the display modules 52 displays at least one first control on the screen.

Optionally, the receiving module 51 is further configured to receive the second input performed by the user for the first target control after the display module 52 displays at least one first control on the screen, where the first target control is a control of at least one first control. The display module 52 is further configured to display at least one object corresponding to the first target control on the screen in response to the second input received by the receiving module 51.

Optionally, the determination module 53 is configured to search for the display content of the first communication window and search for the first scenario information corresponding to the display content of the first communication window in the preset scenario information base; determine the first scenario information as the target scenario information in a case that the first scenario information is found; and determine the pre-defined scenario information as the target scenario information in a case that the first scenario information is not found.

Optionally, the display module 52 is further configured to display the second control on the screen, where the second control is used to indicate target scenario information.

Optionally, the terminal device 50 further includes: a modification module 54; the receiving module 51 is further configured to receive a third input performed by a user for the second control after the display module 52 displays the second control on the screen; the modification module 54 is configured to modify first information in response to the third input received by the receiving module 51; the first information includes at least one of following: target scenario information or an object corresponding to a second target control; and the second target control is a control of the at least one first control.

Optionally, the display module 52 is further configured to display the at least one first control on the screen in a case that the first communication window is switched into a second communication window and a fourth input for the second communication window is received, where first target scenario information corresponding to the first communication window is different from second target scenario information corresponding to the second communication window.

Optionally, the display module 52 is further configured to keep displaying the second control in a case that the first communication window is switched into the second communication window after the second control is displayed on the screen, where the first target scenario information corresponding to the first communication window is different from the second scenario information corresponding to the second communication window.

Optionally, the first input includes a first sub-input and a second sub-input; and the display module 52 is configured to display the second control on the screen in response to the first sub-input and display at least one first control on the screen in response to the second sub-input, where the first sub-input is an input for the first communication window, the second sub-input is an input for the second control, and the second control is used to indicate the target scenario information.

Optionally, the terminal device 50 further includes: a transmitting module 55; the receiving module 51 is further configured to receive a fifth input performed by a user for a target object; and the transmitting module 55 is configured to transmit the target object in the first communication window in response to the fifth input received by the receiving module 51, where the target object is an object of at least one object corresponding to the first target control.

The terminal device 50 provided in this embodiment of the present disclosure can implement processes implemented by the terminal device in the foregoing method embodiments. To avoid repetition, details are not described herein again.

In the terminal device provided by the embodiments of present disclosure, the first input performed by the user may be received in a case that the first communication window is displayed on the screen of the terminal device; and at least one first control associated with the display content of the first communication window is displayed on the screen in response to the first input, where each of the at least one first control respectively corresponds to at least one object, and the display content of the first communication window includes at least one of a communication title, a communication content or a communication object. That is, in a case that a user needs to search for objects such as the meme, the terminal device may display at least one first control with a small number and associated with the current display content, and will not directly display a large number of unordered meme and other objects, so that the user can trigger the terminal device rapidly and conveniently to acquire at least one object corresponding to the first target control, such as the meme required by the user. Therefore, the step that the user searches for the meme in a large number of unordered meme for many times is avoided, that is, the step of searching for the meme is simplified.

Figure 6:
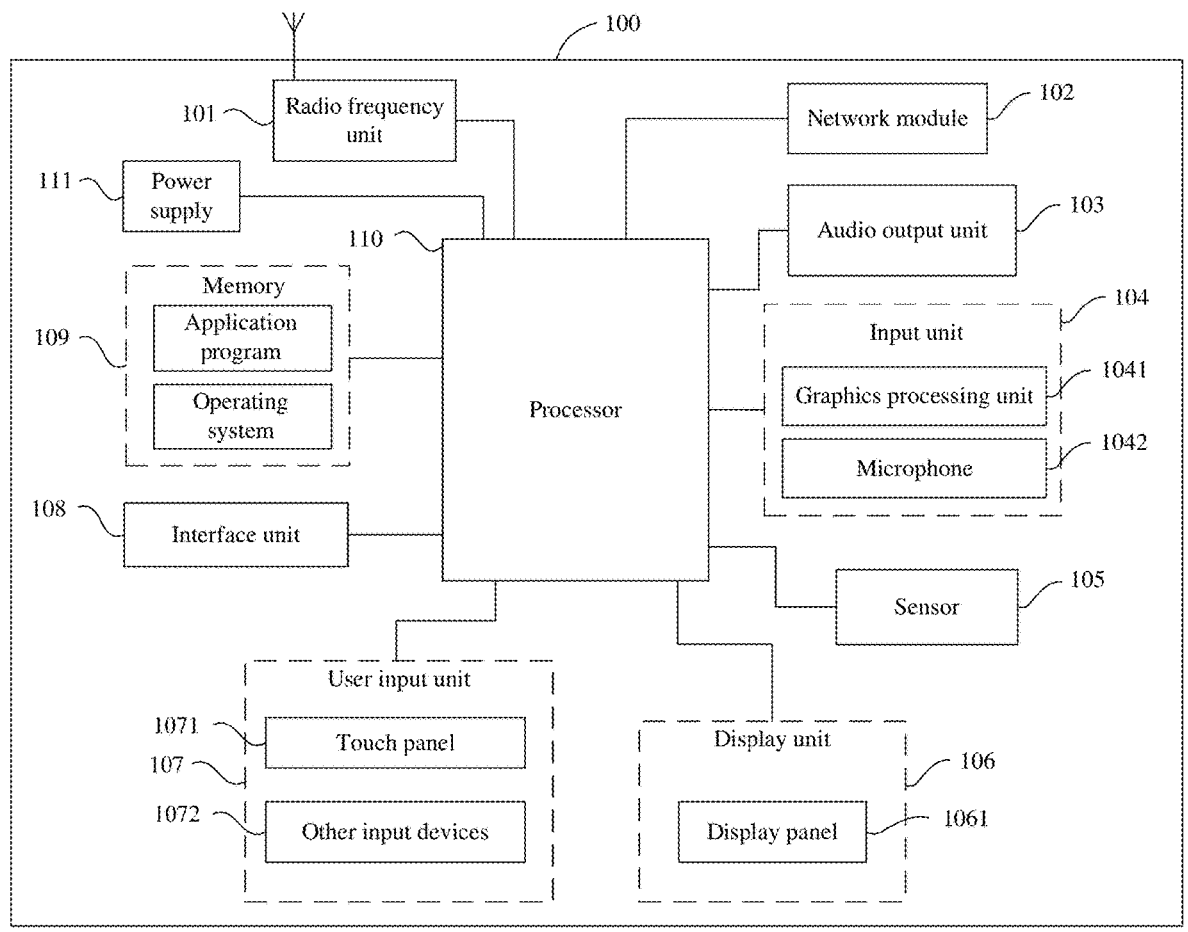
FIG. 6 is a schematic diagram of a hardware structure of a terminal device according to an embodiment of the present disclosure.

FIG. 6 is a schematic diagram of a hardware structure of a terminal device according to an embodiment of the present disclosure. A terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Those skilled in the art can understand that the structure of the terminal device shown in FIG. 6 does not constitute a limitation to the terminal device. The terminal device may include more or fewer components than those shown in the figure, a combination of some components, or different arrangement of components. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The user input unit 107 is configured to receive the first input performed by the user in a case that the first communication window is displayed on the screen of the terminal device; and the display unit 106 is configured to display at least one first control on the screen in response to the first input received by the user input unit 107, where the at least one first control is associated with the display content of the first communication window, each of the at least one first control respectively corresponds to at least one object, and the display content of the first communication window includes at least one of a communication title, a communication content or a communication object.

In the terminal device provided by the embodiments of present disclosure, the first input performed by the user may be received in a case that the first communication window is displayed on the screen of the terminal device; and at least one first control associated with the display content of the first communication window is displayed on the screen in response to the first input, where each of the at least one first control respectively corresponds to at least one object, and the display content of the first communication window includes at least one of a communication title, a communication content or a communication object. That is, in a case that a user needs to search for objects such as the meme, the terminal device may display at least one first control with a small number and associated with the current display content, and will not directly display a large number of unordered meme and other objects, so that the user can trigger the terminal device rapidly and conveniently to acquire at least one object corresponding to the first target control, such as the meme required by the user. Therefore, the step that the user searches for the meme in a large number of unordered meme for many times is avoided, that is, the step of searching for the meme is simplified.

It should be understood that, in this embodiment of the present disclosure, the radio frequency unit 101 may be configured to receive and transmit information or a signal in a call process. Optionally, after receiving downlink data from a base station, the radio frequency unit 101 transmits the downlink data to the processor 110 for processing. In addition, the radio frequency unit 101 transmits uplink data to the base station. Generally, the radio frequency unit 101 includes, but is not limited to, an antenna, at least one amplifier, a transceiver, a coupler, a low noise amplifier, and a duplexer, and the like. In addition, the radio frequency unit 101 may further communicate with another communications device through a wireless communication system and network.

The terminal device provides wireless broadband Internet access for the user by using the network module 102, for example, helping the user to send and receive an email, browse a web page, and access streaming media.

The audio output unit 103 may convert audio data received by the radio frequency unit 101 or the network module 102 or stored in the memory 109 into an audio signal, and output the audio signal as sound. In addition, the audio output unit 103 may further provide an audio output (for example, a call signal receiving sound and a message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 is configured to process image data of a still picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or transmitted via the radio frequency unit 101 or the network module 102. The microphone 1042 may receive a sound and may process such a sound into audio data. The processed audio data may be converted, in a call mode, into a format that may be transmitted to a mobile communication base station by using the radio frequency unit 101 for output.

The terminal device 100 further includes at least one sensor 105, such as an optical sensor, a motion sensor, and other sensors. Optionally, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device. Optionally, the user input unit 107 includes a touch panel 1071 and another input device 1072. The touch panel 1071, also called a touch screen, may collect a touch operation of the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch point coordinates, sends the touch point coordinates to the processor 110, and receives and executes a command sent by the processor 110. In addition, the touch panel 1071 may be implemented in a plurality of forms such as a resistive type, a capacitive type, an infrared ray, and a surface acoustic wave. In addition to the touch panel 1071, the user input unit 107 may further include other input devices 1072. Optionally, the another input device 1072 may include, but not limited to, a physical keyboard, a function key (for example, a volume control key or a switch key), a trackball, a mouse, and a joystick. Details are not described herein again.

Optionally, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 6, the touch panel 1071 and the display panel 1061 are configured as two independent components to implement input and output functions of the terminal device, in some embodiments, the touch panel 1071 and the display panel 1061 may be integrated to implement the input and output functions of the terminal device. This is not specifically limited herein.

The interface unit 108 is an interface for connecting an external apparatus with the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to: receive an input (for example, data information or power) from the external apparatus, and transmit the received input to one or more elements in the terminal device 100, or may be configured to transmit data between the terminal device 100 and the external apparatus.

The memory 109 may be configured to store a software program and various data. The memory 109 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 109 may include a high-speed random access memory, and may further include a nonvolatile memory, for example, at least one disk storage device, a flash memory, or other volatile solid-state storage devices.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may be integrated with an application processor and a modem processor. The application processor mainly processes an operating system, a user interface, an application, and the like, and the modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, the embodiment of the present disclosure further provides a terminal device, including a processor 110, a memory 109, and a computer program stored in the memory 109 and executable on the processor 110. When the computer program is executed by the processor 110, the processes of the foregoing method embodiment are implemented, and a same technical effect can be achieved. To avoid repetition, details are not described herein again.

The embodiments of the present disclosure further provide a non-transitory computer readable storage medium. The non-transitory computer readable storage medium stores a computer program, and when the computer program is executed by a processor, the processes of the foregoing method embodiment are implemented and the same technical effect can be achieved. To avoid repetition, details are not described herein again. The non-transitory computer readable storage medium may be a read-only memory (ROM), a random access memory (RAM), a magnetic disk, a compact disc, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skill in the art may make many forms without departing from the aims of the present disclosure and the protection scope of claims, all of which fall within the protection of the present disclosure.

What is claimed is:

1. A display control method comprising:
receiving a first input performed by a user in a case that a first communication window is displayed on a screen of a terminal device; and
displaying at least one first control on the screen in response to the first input; wherein
the at least one first control is associated with a display content of the first communication window, each of the at least one first control respectively corresponds to at least one object, and the display content of the first communication window comprises at least one of a communication title, a communication content or a communication object; wherein
the at least one first control corresponds to target scenario information, and before the displaying the at least one first control on the screen, the method further comprises:

determining the target scenario information according to the display content of the first communication window; and
the method further comprises:
displaying a second control on the screen, wherein the second control is used to indicate the target scenario information;
receiving a third input performed by a user for the second control; and
modifying first information in response to the third input, wherein the first information comprises at least one of following: the target scenario information or an object corresponding to a second target control, and the second target control is a control of the at least one first control;
and/or
keeping displaying the second control on the screen in a case that the first communication window is switched into a second communication window, the first target scenario information corresponding to the first communication window being different from second target scenario information corresponding to the second communication window.

2. The method according to claim 1, wherein after the displaying the at least one first control on the screen, the method further comprises:
receiving a second input performed by a user for a first target control, the first target control being a control of the at least one first control; and
displaying at least one object corresponding to the first target control on the screen in response to the second input.

3. The method according to claim 2, further comprising:
receiving a fifth input performed by a user for a target object; and
transmitting the target object in the first communication window in response to the fifth input; wherein
the target object is an object of at least one object corresponding to the first target control.

4. The method according to claim 1, wherein the determining the target scenario information according to the display content of the first communication window comprises:
searching for first scenario information corresponding to the display content of the first communication window in a preset scenario information base according to the display content of the first communication window; and
determining the first scenario information as the target scenario information in a case that the first scenario information is found; or
determining predefined scenario information as the target scenario information in a case that the first scenario information is not found.

5. The method according to claim 1, further comprising:
in a case that the first communication window is switched into a second communication window and a fourth input for the second communication window is received, displaying the at least one first control on the screen, wherein the first target scenario information corresponding to the first communication window is different from second target scenario information corresponding to the second communication window.

6. The method according to claim 1, wherein the first input comprises a first sub-input and a second sub-input; and
the displaying the at least one first control on the screen in response to the first input comprises:

displaying a second control on the screen in response to the first sub-input;

displaying the at least one first control on the screen in response to the second sub-input; wherein the first sub-input is an input for the first communication window, the second sub-input is an input for the second control, and the second control is used to indicate the target scenario information.

7. A terminal device, comprising: a processor, a memory, and a computer program stored in the memory and executable on the processor, wherein the computer program, when executed by the processor, causes the terminal device to perform:

receiving a first input performed by a user in a case that a first communication window is displayed on a screen; and displaying at least one first control on the screen in response to the first input; wherein the at least one first control is associated with a display content of the first communication window, each of the at least one first control respectively corresponds to at least one object, and the display content of the first communication window comprises at least one of a communication title, a communication content or a communication object; wherein the at least one first control corresponds to target scenario information; and the computer program, when executed by the processor, causes the terminal device to further perform:

determining the target scenario information according to the display content of the first communication window; and the computer program, when executed by the processor, causes the terminal device to further perform:

displaying a second control on the screen; wherein the second control is used to indicate the target scenario information;

receiving a third input performed by a user for the second control; and modifying first information in response to the third input, wherein the first information comprises at least one of following: the target scenario information or an object corresponding to a second target control, and the second target control is a control of the at least one first control;

and/or keeping displaying the second control on the screen in a case that the first communication window is switched into a second communication window, the first target scenario information corresponding to the first communication window being different from second target scenario information corresponding to the second communication window.

8. The terminal device according to claim 7, wherein the computer program, when executed by the processor, causes the terminal device to further perform:

receiving a second input performed by a user for a first target control, the first target control being a control of the at least one first control; and displaying at least one object corresponding to the first target control on the screen in response to the second input.

9. The terminal device according to claim 8, wherein the computer program, when executed by the processor, causes the terminal device to further perform:

receiving a fifth input performed by a user for a target object; and transmitting the target object in the first communication window in response to the fifth input; wherein the target object is an object of at least one object corresponding to the first target control.

10. The terminal device according to claim 7, wherein the computer program, when executed by the processor, causes the terminal device to perform:

searching for first scenario information corresponding to the display content of the first communication window in a preset scenario information base according to the display content of the first communication window; and determining the first scenario information as the target scenario information in a case that the first scenario information is found; or determining predefined scenario information as the target scenario information in a case that the first scenario information is not found.

11. The terminal device according to claim 7, wherein the computer program, when executed by the processor, causes the terminal device to further perform:

in a case that the first communication window is switched into a second communication window and a fourth input for the second communication window is received, displaying the at least one first control on the screen, wherein the first target scenario information corresponding to the first communication window is different from second target scenario information corresponding to the second communication window.

12. The terminal device according to claim 7, wherein the first input comprises a first sub-input and a second sub-input; and the computer program, when executed by the processor, causes the terminal device to perform:

displaying a second control on the screen in response to the first sub-input;

displaying the at least one first control on the screen in response to the second sub-input; wherein the first sub-input is an input for the first communication window, the second sub-input is an input for the second control, and the second control is used to indicate the target scenario information.

13. A non-transitory computer readable storage medium, wherein the non-transitory computer readable storage medium stores a computer program, and the computer program, when executed by a processor of a terminal device, causes the terminal device to perform:

receiving a first input performed by a user in a case that a first communication window is displayed on a screen; and displaying at least one first control on the screen in response to the first input; wherein the at least one first control is associated with a display content of the first communication window, each of the at least one first control respectively corresponds to at least one object, and the display content of the first communication window comprises at least one of a communication title, a communication content or a communication object; wherein the at least one first control corresponds to target scenario information; and the computer program, when executed by the processor, causes the terminal device to further perform:

determining the target scenario information according to the display content of the first communication window; and the computer program, when executed by the processor, causes the terminal device to further perform:

displaying a second control on the screen; wherein the second control is used to indicate the target scenario information;

receiving a third input performed by a user for the second control;

modifying first information in response to the third input, wherein the first information comprises at least one of following: the target scenario information or an object corresponding to a second target control, and the second target control is a control of the at least one first control;

and/or keeping displaying the second control on the screen in a case that the first communication window is switched into a second communication window, the first target scenario information corresponding to the first communication window being different from second target scenario information corresponding to the second communication window.

14. The non-transitory computer-readable storage medium according to claim 13, wherein the computer program, when executed by the processor, causes the terminal device to further perform:

receiving a second input performed by a user for a first target control, the first target control being a control of the at least one first control; and displaying at least one object corresponding to the first target control on the screen in response to the second input.

15. The non-transitory computer-readable storage medium according to claim 13, wherein the computer program, when executed by the processor, causes the terminal device to perform:

searching for first scenario information corresponding to the display content of the first communication window in a preset scenario information base according to the display content of the first communication window; and determining the first scenario information as the target scenario information in a case that the first scenario information is found; or determining predefined scenario information as the target scenario information in a case that the first scenario information is not found.

16. The non-transitory computer-readable storage medium according to claim 13, wherein the computer program, when executed by the processor, causes the terminal device to further perform:

in a case that the first communication window is switched into a second communication window and a fourth input for the second communication window is received, displaying the at least one first control on the screen, wherein the first target scenario information corresponding to the first communication window is different from second target scenario information corresponding to the second communication window.

\* \* \* \* \*